United States Patent
Boehme et al.

(10) Patent No.: US 9,893,938 B1
(45) Date of Patent: Feb. 13, 2018

(54) APPARATUSES AND METHODS FOR DISTRIBUTED CONFIGURATION MANAGEMENT OF COMMUNICATION DEVICES

(71) Applicant: Sorenson IP Holdings, LLC, Salt Lake City, UT (US)

(72) Inventors: Kenneth Boehme, South Jordan, UT (US); Stacey Nielsen, Farmington, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 260 days.

(21) Appl. No.: 14/701,062

(22) Filed: Apr. 30, 2015

Related U.S. Application Data (60) Provisional application No. 62/073,721, filed on Oct. 31, 2014.

(51) Int. Cl.
*G06F 15/177* (2006.01)
*H04L 12/24* (2006.01)

(52) U.S. Cl.
CPC .......... *H04L 41/0816* (2013.01); *H04L 41/50* (2013.01)

(58) Field of Classification Search
CPC ............................ H04L 41/0816; H04L 41/50
USPC ......................................................... 709/221
See application file for complete search history.

(56) References Cited

U.S. PATENT DOCUMENTS

| | | | |
|---|---|---|---|
| 5,909,482 A | 6/1999 | Engelke | |
| 5,974,116 A | 10/1999 | Engelke et al. | |
| 5,978,654 A | 11/1999 | Colwell et al. | |
| 6,075,841 A | 6/2000 | Engelke et al. | |
| 6,075,842 A | 6/2000 | Engelke et al. | |
| 6,233,314 B1 | 5/2001 | Engelke | |
| 6,307,921 B1 | 10/2001 | Engelke et al. | |
| 6,493,426 B2 | 12/2002 | Engelke et al. | |
| 6,504,910 B1 | 1/2003 | Engelke et al. | |
| 6,510,206 B2 | 1/2003 | Engelke et al. | |
| 6,549,611 B2 | 4/2003 | Engelke et al. | |
| 6,567,503 B2 | 5/2003 | Engelke et al. | |
| 6,594,346 B2 | 7/2003 | Engelke | |
| 6,603,835 B2 | 8/2003 | Engelke et al. | |
| 6,748,053 B2 | 6/2004 | Engelke et al. | |
| 6,882,707 B2 | 4/2005 | Engelke et al. | |

(Continued)

*Primary Examiner* — Wing F Chan
*Assistant Examiner* — Joseph Maniwang
(74) *Attorney, Agent, or Firm* — Maschoff Brennan (57) ABSTRACT

A properties server includes memory configured to store group properties and global properties used to control operation of the communication devices, and a processor configured to manage the group properties and the global properties responsive to modifications made by an administrator, and to transmit the group properties and the global properties to the communication devices. A communication device includes a processor configured to communicate with a properties server to receive a set of properties that includes at least one group property and at least one global property, and memory operably coupled with the processor. The memory is configured to locally store properties used by the processor to operate the communication device, the locally stored properties being configured to be modified responsive to the set of properties received from the properties server. Related devices, communication systems, and methods are also described.

21 Claims, 4 Drawing Sheets

(56) References Cited

U.S. PATENT DOCUMENTS

| | | |
|---|---|---|
| 6,885,731 B2 | 4/2005 | Engelke et al. |
| 6,934,366 B2 | 8/2005 | Engelke et al. |
| 7,003,082 B2 | 2/2006 | Engelke et al. |
| 7,006,604 B2 | 2/2006 | Engelke |
| 7,164,753 B2 | 1/2007 | Engelke et al. |
| 7,319,740 B2 | 1/2008 | Engelke et al. |
| 7,555,104 B2 | 6/2009 | Engelke |
| 7,660,398 B2 | 2/2010 | Engelke et al. |
| 7,881,441 B2 | 2/2011 | Engelke et al. |
| 8,213,578 B2 | 7/2012 | Engleke et al. |
| 8,379,801 B2 | 2/2013 | Romriell |
| 8,416,925 B2 | 4/2013 | Engelke et al. |
| 8,908,838 B2 | 12/2014 | Engelke et al. |
| 8,917,821 B2 | 12/2014 | Engelke et al. |
| 8,917,822 B2 | 12/2014 | Engelke et al. |
| 2008/0187108 A1 | 8/2008 | Engelke et al. |
| 2011/0123003 A1* | 5/2011 | Romriell ............... G06F 17/273 379/52 |
| 2011/0170672 A1 | 7/2011 | Engelke et al. |
| 2012/0250837 A1 | 10/2012 | Engleke et al. |
| 2014/0129686 A1* | 5/2014 | Haemel ............... G06F 9/44505 709/220 |
| 2015/0052621 A1* | 2/2015 | Yi ........................ H04L 63/102 726/31 |
| 2016/0087855 A1* | 3/2016 | Vlachogiannis ........ H04L 67/40 709/223 |

* cited by examiner

APPARATUSES AND METHODS FOR DISTRIBUTED CONFIGURATION MANAGEMENT OF COMMUNICATION DEVICES

CROSS-REFERENCE TO RELATED APPLICATION

This application claims the benefit of U.S. Provisional Patent Application Ser. No. 62/073,721, filed Oct. 31, 2014, the disclosure of which is hereby incorporated herein in its entirety by this reference.

FIELD

Embodiments of the disclosure relate to the distributed configuration management of communication devices. More particularly, the disclosure relates to organizing and managing properties supported by a plurality of communication devices of a communication system.

BACKGROUND

Communication systems, such as conventional telephone communication systems, provide communication between two or more users during a communication session. Communication systems that support a large number of communication devices may have difficulty implementing changes to some of the configuration features (i.e., functional properties) of the individual communication devices on a large scale. This difficulty may be particularly true for communication systems that are designed to assist hearing-impaired users as there may be new features that are developed that are desired to be tested prior to full scale implementation to all communication devices of the communication system. In addition, such communication devices may be closely regulated, and new rules may be passed that may affect some or even all of the communication devices of the communication system. The inventors have appreciated devices and methods for distributed configuration management of one or more communication devices of a communication system.

BRIEF SUMMARY

Described is a properties server for a communication system having a plurality of communications devices. The properties server includes memory configured to store group properties and global properties used to control operation of the communication devices, and a processor coupled with the memory. The processor is configured to manage the group properties and the global properties responsive to modifications made by an administrator, and to transmit the group properties and the global properties to the communication devices. The group properties apply to a subset of the plurality of communication devices managed by the communication system, and global properties apply to all of the plurality of communication devices managed by the communication system.

In some embodiments, disclosed is a communication device. The communication device includes a processor configured to communicate with a properties server to receive a set of properties that includes at least one group property and at least one global property; and memory operably coupled with the processor. The group properties apply to a subset of the plurality of communication devices managed by the communication system, and global properties apply to all of the plurality of communication devices managed by the communication system. The memory is configured to locally store properties used by the processor to operate the communication device. The locally stored properties are configured to be modified responsive to the set of properties received from the properties server.

In some embodiments, disclosed is a communication system. The communication system includes a plurality of communication devices, and a properties server operably coupled with the plurality of communication devices. The properties server is configured to organize at least some communication devices into a group that is a subset of the plurality of communication devices, manage a set of global properties that apply to all of the plurality of communication devices, manage a set of group properties that apply to the group of communication devices, and transmit the global properties to all of the plurality of communication devices subject to a group property override for communication devices that are part of the group of communication devices.

In some embodiments, disclosed is a method of managing distributed configuration properties of communication devices of a communication system. The method includes storing a set of global properties that apply to all communication devices of the communication system, storing a set of group properties that apply to a group of communication devices that is a subset of the communication devices of the communication system, modifying at least one of the set of global properties and the set of group properties, and transmitting the global properties to all of the plurality of communication devices subject to a group property override for communication devices that are part of the group of communication devices.

In some embodiments, disclosed is a method of a communication device of a communication system having distributed management of configuration properties. The method includes requesting a set of properties from a properties server, the set of properties including at least one group property that is shared with another communication device of a same group that is subset of the communication devices of the communication system, and at least one global property that is shared with other communication devices of the communication system regardless of whether it is of the same group, storing the set of properties locally on the communication device, and operating the communication device according to the set of properties stored locally on the communication device.

In some embodiments, disclosed is a communication system for facilitating communication for a hearing-impaired user. The communication system includes a plurality of communication devices that are each configured to provide assistance for a hearing-impaired user during a real-time conversation, a relay service operably coupled with the plurality of communication devices, the relay service configured to provide interpretive services for the hearing impaired user; and a properties server operably coupled with the plurality of communication devices. The properties server configured to organize at least some communication devices into a group that is a subset of the plurality of communication devices, manage a set of global properties that apply to all of the plurality of communication devices, manage a set of group properties that only apply to the group of communication devices, and transmit the global properties to all of the plurality of communication devices subject to a group property override for communication devices that are part of the group of communication devices. At least one of the set of group properties and the set of global properties includes a property that is associated with the interpretive services provided by the relay service.

DETAILED DESCRIPTION

In the following detailed description, reference is made to the accompanying drawings that form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a general-purpose computer because, absent the disclosure, the general-purpose computer would not be able to carry out the processes of the disclosure. The disclosure also provides meaningful limitations in one or more particular technical environments that go beyond an abstract idea. For example, embodiments of the disclosure provide improvements in the technical field of telecommunications, configuration management, and in particular in organizing, managing, updating properties for a large number of communication devices within a communication system, including groups of communication devices within the communication system. Such properties may be used to control the operation of the communication devices to improve the operation and/or user experience thereof.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, a hearing-impaired user may be a person with diminished hearing capabilities. Some hearing-impaired users may have some level of hearing and/or speaking ability, while others may not have any such ability. Hearing-impaired users may need to be certified in order to access the communication system.

Figure 1:
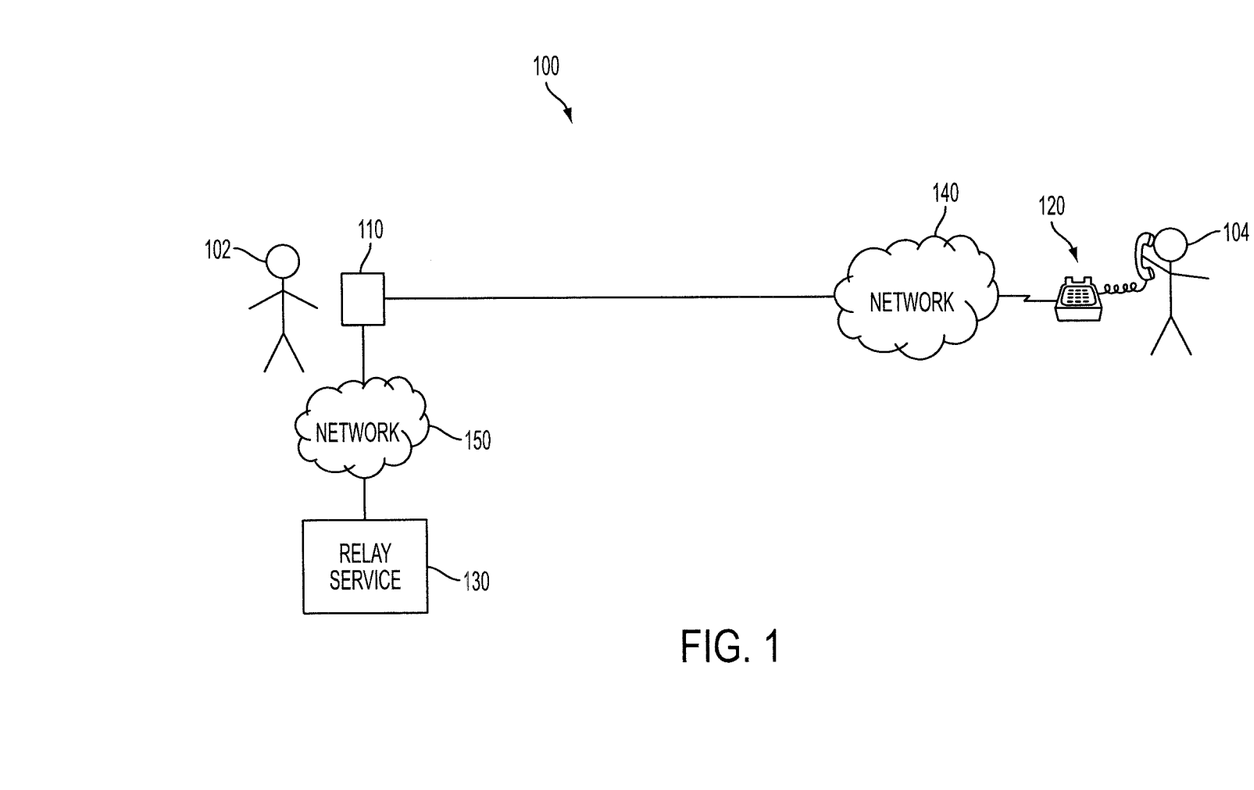
FIG. 1 illustrates a communication system configured to facilitate a communication session between a hearing-impaired user and a hearing-capable user hereof.

FIG. 1 illustrates a communication system 100 configured to facilitate a communication session between a hearing-impaired user 102 and a hearing-capable user 104 according to an embodiment of the disclosure. The communication system 100 may include a first communication device 110, a second communication device 120, and a relay service 130. The first communication device 110 and the second communication device 120 may be coupled together to facilitate communication therebetween via a first network 140. The first communication device 110 and the relay service 130 may be coupled together to facilitate communication therebetween via a second network 150. For example only, the first network 140 and the second network 150 may each be implemented according to the standards and bandwidth requirements of a communication network (e.g., Public Switch Telephone Network (PSTN), cellular network, Voice Over Internet Protocol (VOIP) networks, etc.). The use of the terms "network" or "communication network" as used herein contemplates networks that are compatible and configured to provide communications using analog and/or digital standards unless specifically stated otherwise. In some embodiments, the first network 140 and the second network 150 may be the same network (e.g., both connections may be Internet-based connections). Thus, discussion of the first network 140 and the second network 150 separately may be for convenience of discussing a particular connection between two or more devices. Of course, in some embodiments, the first network 140 and the second network 150 may be different networks. For example, the first communication device 110 and the second communication device 120 may communicate via a PSTN network connection, while the first communication device 110 and the second communication device 120 may communicate via an internet connection. Other variations and combinations of networks are also contemplated.

The first communication device 110 may include a device that is configured to assist the hearing-impaired user 102 in communicating with another individual (e.g., hearing-capable user 104 or another hearing-impaired user). In some embodiments, the first communication device 110 may include a captioned telephone, a telephone enabled for text enhanced telephony, or any other suitable communication device configured to receive and display a text caption of at least a portion of the conversation. Thus, the hearing-impaired user 102 may be able to read a caption of the words spoken by the hearing-capable user 104 to supplement the audio generated by the first communication device 110 from the voice signal received by the first communication device 110. As a result, the hearing-impaired user 102 may have an improved experience in understanding the conversation. Such an embodiment may be useful for people whose hearing has been damaged or decreased over time (e.g., the elderly); such that they can still speak but have diminished hearing that makes it difficult to communicate. In some embodiments, the first communication device 110 may include a communication device (e.g., video telephone) configured to receive and display video on an electronic display on the first communication device 110. In addition, the first communication device 110 may include a camera configured to capture and transmit a video signal to the relay service 130 and/or the second communication device 120. As a result, the hearing-impaired user 102 may be able to use visual communication (e.g., sign language) to communicate with others. Such an embodiment may be useful for people whose hearing has been damaged or decreased over time, but who may not be able to verbally communicate well and/or have such damaged hearing that they cannot hear.

The second communication device 120 may comprise a conventional voice telephone (e.g., landline phone, cellular phone, smart phone, VoIP phone, etc.). As such, the hearing-capable user 104 may interact in a conventional manner with the second communication device 120. In some embodiments, the second communication device 120 may be configured similarly as the first communication device (e.g., captioned phone, video phone, etc.). As a result, the second communication device 120 may likewise be operated by a hearing-impaired user. Thus, although facilitating communication between the hearing-impaired user 102 and the hearing-capable user 104 is shown in FIG. 1, such a situation is shown only as an example. Other embodiments include both the first communication device 110 and the second communication device 120 coupled to the relay service 130 to facilitate the interpretive services for each respective hearing-impaired user.

The relay service 130 may be configured to provide interpretive services (e.g., captioning, video) to the hearing-impaired user 102. More specifically, a human "call assistant" within relay service 130 may be employed to facilitate a communication session between a hearing-impaired user 102 and a hearing-capable user 104. As discussed above, in some embodiments the relay service 130 may be configured to provide text captions of at least a portion of the conversation. In such an embodiment, the call assistant may listen to the voice signal received and re-voice the portion of the conversation into a microphone so that voice recognition software may generate the text transcription that is transmitted to the first communication device 110. In some embodiments, the relay service 130 may be configured to provide sign language interpretive services. In such an embodiment, the call assistant may communicate with the hearing-impaired user 102 over a video connection (e.g., via sign language), and then the call assistant may then communicate with the hearing-capable user over a voice connection. Thus, the relay service 130 may include one or more of an internet protocol captioned telephone service (IPCTS), captioned telephone service (CTS), video relay service (VRS), or other telecommunications relay services (TRS).

FIG. 1 shows a configuration where the first communication device 110 acts as a router for the voice signal from the second communication device 120 to the relay service. In such an embodiment, the voice signal of the hearing-capable user 104 may be transmitted from the second communication device 120 to the first communication device 110. The voice signal of the hearing-capable user 104 may then be transmitted from the first communication device 110 to the relay service 130 for the text transcription to be generated in a text captioning embodiment. The text transcription may then be transmitted from the relay service 130 to the first communication device 110 to be displayed as a text caption for the hearing-impaired user to read during the conversation. The call assistant may also monitor the text transcription that is generated and transmitted to the first communication device 110 to identify any errors that may have been generated by the voice recognition software. The call assistant may correct such errors, such as described in U.S. Pat. No. 8,379,801, issued Feb. 19, 2013, entitled "Methods and Systems Related to Text Caption Error Correction," the disclosure of which is incorporated herein in its entirety by this reference. In some embodiments the relay service 130 may be configured to receive the voice signal from the second communication device 120 and route the voice signal to the first communication device 110. In some embodiments, another device may receive the voice signal from the second communication device 120 and split the voice signal to route to both the first communication device 110 and the relay service 130.

In addition, although FIG. 1 shows only two communication devices 110, 120, the communication system 100 may include more communication devices. It is contemplated that the communication system 100 may facilitate communication between any number and combinations of hearing-impaired users and hearing-capable users. For example, in some embodiments two or more communication devices may be connected for facilitating communication between a hearing-impaired user and other hearing-impaired users and/or hearing-capable users.

The communication system 100 may include a relatively large number of different communication devices that may at any given time connect with the relay service 130 for which interpretive services may be provided. At times, the administrator of the communication system 100 may desire to change one or more functional properties of the communication devices of the communication system 100. The communication system 100 may include a properties server that is configured to store and manage such functional properties for the communication devices as will be described further below. The administrator of the communication system and the properties server may also be the administrator of the relay service 130.

Figure 2:
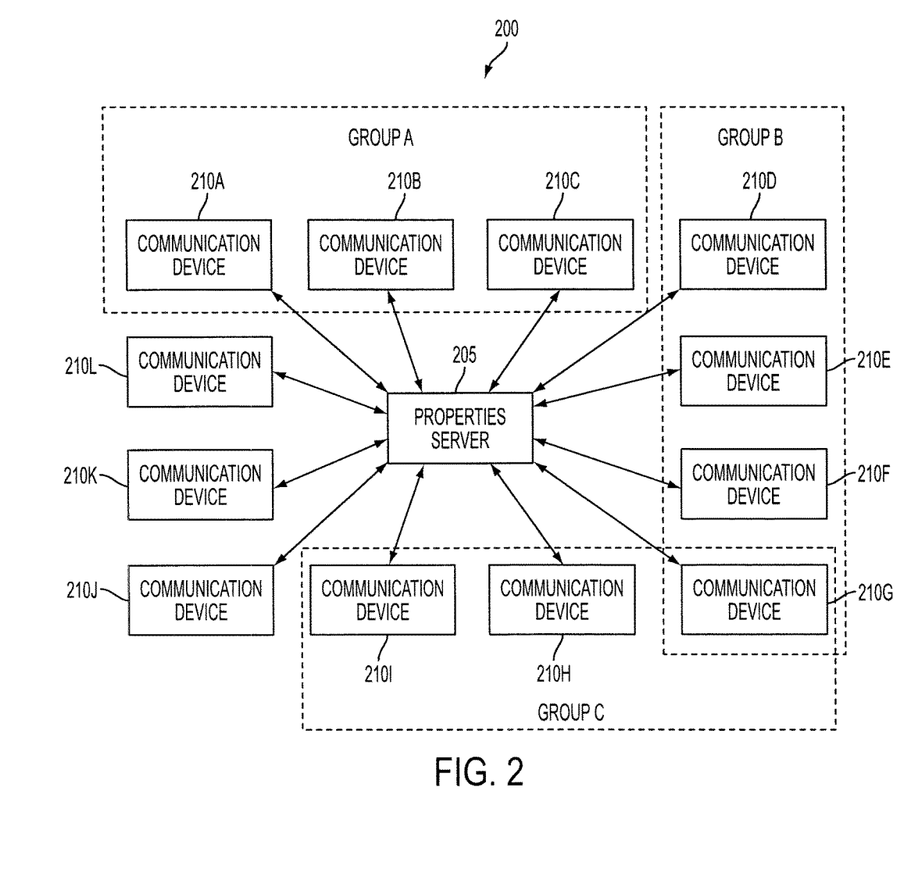
FIG. 2 is a communication system according to an embodiment of the disclosure.

FIG. 2 is a communication system 200 according to an embodiment of the disclosure. The communication system 200 includes a properties server 205 operably coupled with a plurality of communication devices 210A-210L. The communication devices 210A-210L may be configured as one of the communication devices 110 of FIG. 1. For example, the communication devices 210A-210L may be configured to couple with the relay service 130 (FIG. 1) that provides interpretive services for a hearing-impaired user. Thus, the communication devices 210A-210L may include caption phones, video phones, etc. that are configured to facilitate communication for a hearing-impaired user.

In some embodiments, the communication devices 210A-210L may be organized into groups. For example, the communication devices 210A-210C may be organized into Group A, the communication devices 210D-210G may be organized into Group B, and the communication devices 210G-210L may be organized into Group C. As illustrated, some communication devices 210G may be part of multiple groups (e.g., Group B and Group C). There may also be some communication devices 210J-210L that are not organized into any groups. In some embodiments, the properties server 205 may support groups that have been created and defined that have not yet had any communication devices assigned to them. Such groups may be left dormant until a communication device has a characteristic that falls within the definition of the group.

A group is a sub-set of the communication devices 210A-210L that are organized according to at least one common factor. Organization of the communication devices 210A-210L into groups may be based on a variety of different factors. In some embodiments, the communication devices 210A-210L may be grouped based on ownership. In other words, multiple communication devices having a common owner may be organized as a separate group. For example, an individual may own multiple communication devices within their home or even spread across multiple locations. In some embodiments, some of the communication devices 210A-210L may be grouped based on the common characteristics of the users and/or owners. For example, users may be divided into groups based on factors such as level of hearing loss, vision problems, age, or any other common characteristic of the user. As another example, an organization may include multiple communication devices at one or more locations of the owner's operations.

In some embodiments, some of the communication devices 210A-210L may be grouped based on being location within a specific defined area. For example, the specific defined area may include a household, a business, a building, a city, a state, a country, a particular jurisdiction, or some other area as desired. Such a grouping may be independent of actual ownership or users. Defining a group based on location may be beneficial as different communication devices 210A-210L may be subject to different rules (e.g., policies, regulations, and/or laws) that may govern the use of the communication devices 210A-210L in a particular way. For example, rules of one location may require that captions be turned off by default, whereas rules of another location may require that captions be turned on by default. Some locations may permit the user to define the default status of captions according to the desires of the user, whereas other locations may not permit the user to have that option. In some embodiments, some of the communication devices 210A-210L may be grouped based on legal status of the users. For example, certain users may be legally exempted from certain rules that are required of other users.

In some embodiments, some of the communication devices 210A-210L may be grouped based on being part of a test group. For example, a group of communication devices 210A-210L may be used as a group for alpha and/or beta testing of new and/or modified features.

The properties server 205 may be configured to store and manage functional properties associated with the communication devices 210A-210L of the communication system 200. The functional properties may include any functional property that is supported by the firmware of the communication devices 210A-210L. As non-limiting examples, the functional properties may include one or more display properties, audio properties, device location properties, operational properties, data storage properties, software properties, and other functional properties that are supported by the communication devices 210A-210L.

Display properties may include properties that control the visual aspects of the electronic display of the communication devices 210A-210L. For example, the visual aspects may include the color scheme of the display, the backlight brightness on the display, color contrast, the text fonts used, font size, language of text used, etc.

Audio properties may include properties that control audio aspects of the communication devices 210A-210L. For example, audio aspects may include the ring tone, the ring pitch, the ring volume, the handset volume, the speaker volume, etc.

Device location properties may include other information related to the location of the communication devices 210A-210L. For example, a time zone property may indicate the time zone in which the particular communication device 210A-210L is located. A daylight savings property indicates whether the communication device 210A-210L device is located in an area that has daylight savings. A zip code property may indicate a physical location of the communication devices 210A-210L. Likewise, an area code property, IP address property, GPS property, or other similar property may indicate a physical location of the communication devices 210A-210L.

Operational properties may include properties that control operational aspects of the communication devices 210A-210L. For example, operational properties may include a caption default property, a flashing ring property, icon operation properties, voicemail properties, a log-in property that may control whether a log-in is required for use, scrolling properties, navigational properties, etc.

Data storage properties may include properties that control the information logged by the communication devices 210A-210L. For example, data storage properties may also include a property that controls the number and organization of prior call information, contact lists, etc.

Software properties may include properties that indicate the software being used to operate the communication devices 210A-210L. For example, the software properties may include an indication of the operating system, the version of the operating system, and other properties indicating information about the software.

One or more functional properties may be assigned to specific endpoint properties, to group properties, and/or to global properties. Each of these different types of functional properties will be discussed individually.

A global property may be a functional property that is generally applicable to all communication devices 210A-210L of the communication system 200. In other words, global properties may be universal to all communication devices 210A-210L supported by the communication system 200. The administrator of the communication system 200 may change the global properties. The global properties may be stored in a separate repository of the properties server 205 such that the administrator may have one place to modify the global properties to be applied to all communication devices 210A-210L of the communication system 200. Modifying the global properties may include adding a new global property, deleting a global property, setting a value of the global property, and changing a value of the global property.

A group property may be a functional property that is group specific. In other words, a change to group property may only change that property as it is applied to the communication devices 210A-210L that belong to the same group. The group properties may be stored in a separate repository of the properties server 205 associated with the particular group, such that the administrator may have one place to modify the global properties to be applied to all communication devices 210A-210L of the particular group within the communication system 200. Modifying the group properties may include adding a new group property, deleting a group property, setting a value of the group property, and changing a value of the group property. In some embodiments, group properties may override global property values of the same type. For example, if the communication device 210A-210L is part of a group, and if there is a conflict between a global property and a group property of the same type, the communication device 210A-210L may use the group property. A conflict refers to the values of a group property and a global property being different for the same property type (e.g., caption default on). In some embodiments, overriding the global property may be performed by the properties server 205. For example, the properties server 205 may send the group property to the communication device 210A-210L rather than global property for that property type if a conflict arises. In some embodiments, overriding the global property may be performed by the communication devices 210A-210L. For example, the communication devices 210A-210L may receive all global properties and group properties, and the firmware of the communication devices 210A-210L may be configured to apply the group property rather than the global property for that particular property type.

An endpoint property may be a property that is endpoint specific. In other words, a change to an endpoint property may only change that property as it is applied to the specific communication device 210A-210L. The users may change endpoint properties. For example, the user may update the Ring Volume property of one of the communication devices (e.g., communication device 210A) without affecting the Ring Volume property of the other communication devices (e.g., communication devices 210B-210L) of the communication system 200. The endpoint properties may be stored locally on the respective communication device 210A-210L. In some embodiments, the communication devices 210A-210L may transmit their endpoint properties to the properties server 205 (e.g., for backup, for data collection/analytics, etc.). The communication devices 210J-210L that are not part of any group may simply be controlled by either endpoint properties and/or global properties.

At the properties server 205, functional properties may be organized group properties and/or global properties. The administrator of the communication system 200 may modify the group properties and/or global properties in order to cause a change in the functional properties for a plurality of different communication devices 210A-210L. For example, the administrator may desire to make a change in a functional property that applies to all communication devices 210A-210L of the communication system 200. To make this change, the administrator may modify the functional property in the global property repository on the properties server 205. As a result, a widespread change in one or more functional properties may be made to all the communication devices 210A-210L of the communication system 200. In some situations, the administrator of the communication system 200 may desire to make a change in a functional property that only applies to one or more groups of the communication devices 210A-210L. To make this change, the administrator may modify the functional property in the group property repository on the properties server 205 for the particular group to be affected. As a result, a change in one or more functional properties may be made to a particular group (e.g., Group A) of the communication devices (e.g., communication devices 210A-210C) without affecting the remaining communication devices (e.g., communication devices 210D-210L) of the communication system 200.

In the case of a conflict between a group property and a global property, such group properties may override the global properties so that only the smaller group is controlled by the conflicting group property. As a result, an administrator may have the ability to modify functional properties for all communication devices 210A-210L remotely through a single portal, while also having the flexibility of creating smaller groups that may be exempted (e.g., whether permanently or temporarily) from the group properties by having their own set of group properties. For example, an administrator may be able to test a desired set of functional properties on a test group of communication devices 210A-210C (e.g., Group A) without affecting the operation of the remaining communication devices 210D-210L even though a functional property exists as a global property for the communication devices 210A-210L of the communication system 200.

Some properties may be modified by an endpoint property (e.g., ringer pitch, ringer volume, etc.); however, other properties may not be allowed to be modified by the user. For example, in some embodiments the caption default property may only be set by the administrator of the communication system 200 (e.g., through the global and/or group properties).

In some embodiments, the communication devices 210A-210L may be configured to transmit a request for functional properties (e.g., global and/or group properties) responsive to the occurrence of an event trigger. In some embodiments, the event trigger may be responsive to the respective communication device 210A-210L is powered up. In some embodiments, the event trigger may occur based on a pre-determined schedule (e.g., every three minutes, every fifteen minutes, every hour, etc.) for the respective communication device 210A-210L. The pre-determined schedule may be based on the actual time of day (e.g., 10:00, 10:15, 10:30, etc.). The pre-determined schedule may be based on an interval based on another event (e.g., every three minutes after power up). In some embodiments, the pre-determined schedule may be set such that the requests from the different communication devices 210A-210L of the communication system 200 may be staggered. For example, if the communication devices 210A-210L are configured to request the functional properties according to pre-determined intervals after power up, the communication devices 210A-210L may likely be configured to transmit request at different times because the communication devices 210A-210L are unlikely to have all been powered up at the same time. Thus, the requests sent to the properties server 205 may be spread out over time so as to not overload the properties server 205 such that the number of requests spike at the same time.

In some embodiments, the event trigger may be responsive to a signal received from the properties server 205. For example, the properties server 205 may transmit a message to all the communication devices 210A-210L to inform the communication devices 210A-210L that a change to the global and/or group properties has occurred. Responsive to receiving such a message, the communication devices 210A-210L may then transmit the request to obtain the updated functional properties. In some embodiments, a change to the group properties to Group A may cause the properties server 205 to inform the communication devices 210A-210C that a change has occurred, to which the communication devices 210A-210C may respond by requesting properties. In some embodiments, changes to group properties may be pushed down in the first instance rather than merely informing the communication devices 210A-210C and awaiting the next request. In some embodiments, changes to global properties may not cause the properties server 205 to transmit any information or properties. Rather, the communication devices 210A-210C may simply receive the updated properties on the next normally occurring request.

A few of the contemplated properties will be used to illustrate the following example. A caption default property may have one of two states (e.g., true/false, on/off, I/O etc.) that may be used to control whether or not a communication device 210 may begin captioning by default during a communication session. If the caption default property is "false," the hearing-impaired user may be required to affirmatively select captioning in order for captions to be enabled for the communication device 210A-210L. If the caption default property is "true," the communication device 210A-210L may couple with the relay service 130 to request captioning automatically without the hearing-impaired user 102 (FIG. 1) being required to make an affirmative selection. In some embodiments, the communication device 210A-210L may automatically couple with the relay service 130 before the connection is established (e.g., while the call is dialing). In some embodiments, the communication device 210A-210L may automatically couple with the relay service 130 after the connection is established (e.g., responsive to the call being answered). A ringer pitch property may have one or more different states (e.g., 1, 2, 3, etc.) that may be used to control the pitch of the ring of the communication device 210A-210L. A ringer volume property may have one or more different states (e.g., 1, 2, 3, etc.) that may be used by the communication devices 210A-210L to control the volume of the ring of the communication devices 210A-210L.

The administrator of the properties server 205 may assign the following properties to be global properties:

| Global Properties | |
| --- | --- |
| Caption Default | False |
| Ringer Pitch | 2 |
| Ringer Volume | 4 |

As a result, each of the communication devices 210A-210L may receive these properties responsive to requesting the global properties and group properties from the properties server 205.

The administrator may also assign the following properties to be group properties for Groups A, B, and C, respectively:

| Group A Properties | |
| --- | --- |
| Caption Default | True |

| Group B Properties | |
| --- | --- |
| Caption Default | False |
| Flashing Ringer | True |

| Group C Properties | |
| --- | --- |
| Handset Volume | 3 |
| Speaker Volume | 4 |

Prior to transmitting the properties to the communication devices 210A-210L, the properties server 205 may resolve any conflicts between the group properties and the global properties. Based on these group properties, the properties transmitted to the communication devices 210A-210C of Group A may be: Caption Default=True; Ringer Pitch=2; Ringer Volume=4. The caption default property may be different than the global properties because the properties server 205 may be configured to transmit the group property rather than the global property when both exist for the same functional property. As a result, the conflict may be resolved by transmitting the group property rather than the global property.

The properties transmitted to the communication devices 210D-210F of Group B may be: Caption Default=False; Ringer Pitch=2; Ringer Volume=4; Flashing Ringer=True. In this situation, the group property (Caption Default=False) did not conflict. There was, however, a group property (Flashing Ringer=True) that was not part of the global properties. As a result, the properties transmitted had the same values as the global properties, but further included the additional group properties specific to Group B. As a result, the communication devices 210D-210F may control the electronic display to flash while the communication devices 210D-210F are receiving calls and ringing.

The properties transmitted to the communication devices 210H-210L of Group C may be: Caption Default=False; Ringer Pitch=2; Ringer Volume=4; Handset Volume=3; Speaker Volume=4. In this situation, the group properties did not conflict with any of the global properties. There were, however, group properties (Handset Volume=3, Speaker Volume=4) that were not part of the global properties. As a result, the properties transmitted had the same values as the global properties, but further included the additional group properties specific to Group C.

It is noted that in this example, communication device 210G is part of both Group B and Group C. Thus, the properties transmitted to the communication device 210G may be Caption Default=False; Ringer Pitch=2; Ringer Volume=4; Flashing Ringer=True; Ringer Volume=4; Flashing Ringer=True. Thus, the properties transmitted to the communication device 210G were the global properties along with the additional group properties of both Group B and Group C. If there were a conflict for a communication device that is shared by different groups, the properties server 205 may be configured to resolve that conflict as desired by the administrator (e.g., one group may take priority over the other group).

The properties transmitted to the communication devices 210J-210L may be: Caption Default=False; Ringer Pitch=2; Ringer Volume=4, which are simply the global properties as they are not assigned to any group.

Figure 3:
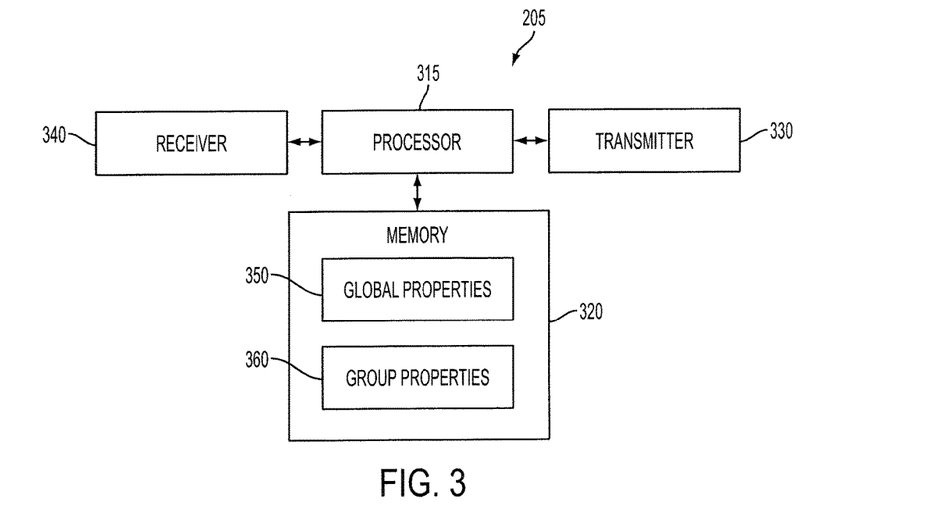
FIG. 3 is a simplified block diagram of the properties server of FIG. 2.

FIG. 3 is a simplified block diagram of the properties server 205 of FIG. 2. The properties server 205 may include a processor 315 operably coupled to a memory 320, a transmitter 330, and a receiver 340. The memory 320 may include a computer-readable medium, comprising any of a random access memory (RAM), a read-only memory (ROM), a Flash memory, other suitable memory devices, and combinations thereof. The memory 320 may store the repositories (e.g., databases) for the global properties 350 and the group properties 360. The memory 320 may further instructions that may be executed by the processor 315 to implement the operations described herein.

In operation, the administrator may communicate with the properties server 205 (e.g., via a remote computer) to modify the global properties and/or group properties for the communication devices 210A-210L (FIG. 2) of the communication system 200 (FIG. 2). These modifications may be stored in the appropriate repository in the memory 320. Thus, the modifications may transform data from one state to another state within the memory 320 such that a modified repository now exists in the memory 320. The transformation may include one state (e.g., true) to another state (e.g., false), one state (e.g., no global/group property exists) to another state (e.g., a global/group property now exists), or some other transformation according to the inputs received from the administrator. The properties server 205 may communicate to the communication devices 210A-210L via the transmitter 330 and the receiver 340 to receive requests and transmit the properties as discussed above.

Figure 4:
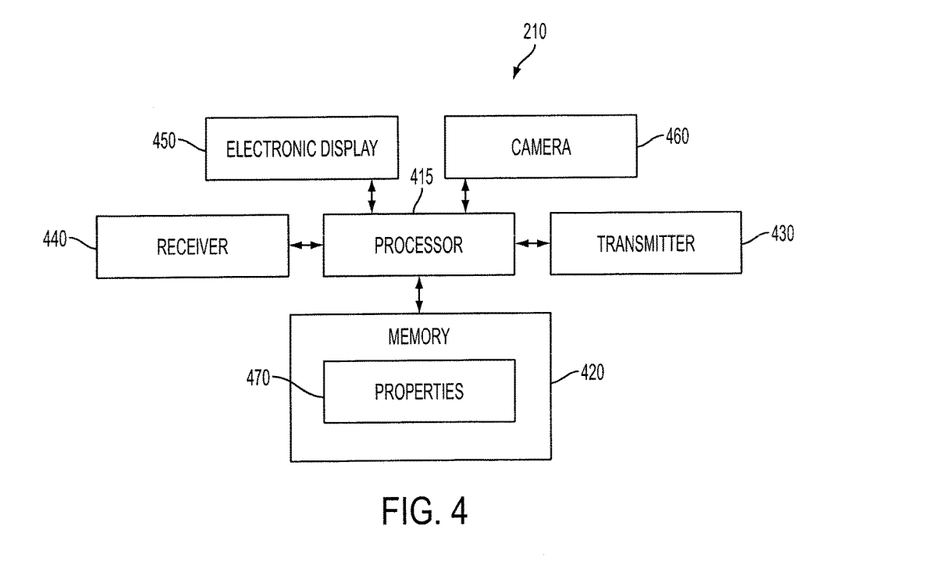
FIG. 4 is a simplified block diagram of one of the communication devices of FIG. 2.

FIG. 4 is a simplified block diagram of one of the communication devices 210 of FIG. 2. The communication device 210 may include a processor 415 operably coupled to a memory 420, a transmitter 430, a receiver 440, an electronic display 450, and a camera 460. The memory 420 may include a computer-readable medium, comprising any of a random access memory (RAM), a read-only memory (ROM), a Flash memory, other suitable memory devices, and combinations thereof. Other I/O devices may be included (e.g., a speaker, microphone, touch screen, keypad, etc.) to facilitate other communications of the communication device 210.

The memory 420 may store the repository (e.g., database) for the properties 470 supported by the firmware of the communication device 210. The memory 420 may further include instructions that may be executed by the processor 415 to implement the operations described herein. The electronic display 450 may be configured to display the text captions as discussed above for embodiments that include a captioned communication device. The electronic display 450 may be configured to display video as discussed above for embodiments that include a video communication device. The camera 460 may be configured to capture video for embodiments that include the video communication device. The communication device 210 may be configured to communicate with another communication device and/or relay service as discussed above.

In operation, the communication device 210 (e.g., the processor 415 via the transmitter 430) may request the properties (e.g., the global properties and/or group properties) that are associated with the communication device 210. The request may be transmitted responsive to the occurrence of an event trigger as discussed above. The properties server 205 (FIG. 3) may transmit the properties as discussed above, including resolving any conflicts that may exist between the global properties and any group properties. The properties may be received by the communication device 210 via the receiver 440. The memory 420 may store the properties 470. The properties 470 may be organized in one properties repository (e.g., database) for all the properties supported by the firmware of the communication device 210. In some embodiments, the properties 470 may be organized within the communication device 210 as being one or more of a group property, a global property, and an endpoint property. As modifications are made with new properties received from the properties server 205, the properties 470 stored locally in the memory 420 may be transformed from one state to another state. Likewise, the properties 470 may be transformed from one state to another state responsive to modification made to the endpoint properties (e.g., by the user, by a technician, etc.) for properties that may be permitted to be modified locally.

Figure 5:
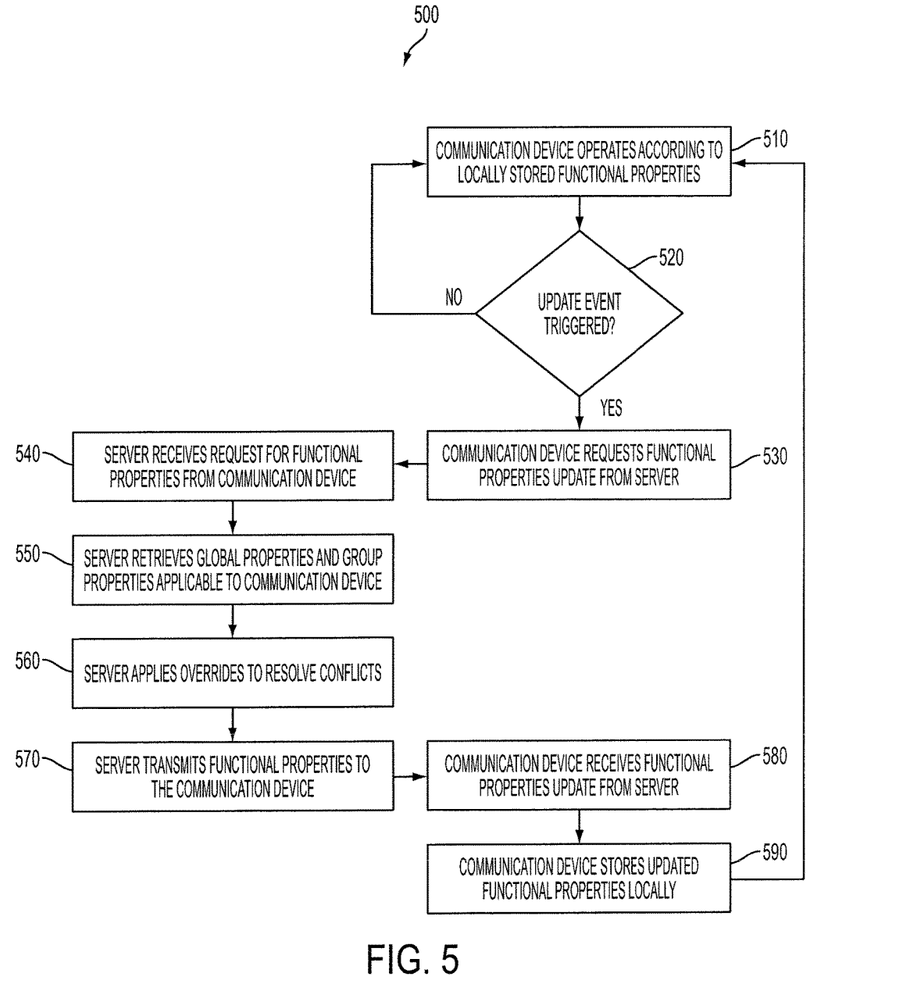
FIG. 5 is a simplified flowchart illustrating a method of operating communication device and a properties server within a communication system hereof.

FIG. 5 is a simplified flowchart illustrating a method of operating communication device and a properties server within a communication system according to an embodiment of the disclosure. At operation 310, the communication device may operate according to locally stored functional properties. The locally stored functional properties may be the initial settings for the communication device or updated local, group, and/or global properties if such functional properties have previously been modified.

At operation 520, the communication device determines if an update event has been triggered. As discussed above, an update event trigger may occur responsive to a predetermined schedule or other time interval, to a signal from the properties server, or to another event (e.g., power up). If an update event has not been triggered, the communication device continues to operate according to the current set of functional properties stored in the communication device. If the update event has been triggered, the communication device requests a functional properties update from the properties server at operation 530.

At operation 540, the properties server receives the request for functional properties from the communication device. At operation 550, the properties server retrieves the global properties as well as any group properties applicable to communication device. At operation 560, the properties server may apply overrides to resolve conflicts. As discussed above, group properties may override the global properties. At operation 570, the properties server transmits the applicable functional properties to the communication device. At operation 580, the communication device receives the updated functional properties from the server. At operation 590, the communication device stores updated functional properties locally. In some embodiments, the overrides may be applied locally by the communication device rather than by the properties server. As a result, the entire set of global and group properties may be transmitted to the communication device to apply the overrides. However, there may be additional benefits to having the overrides performed at the properties server for simplicity.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A properties server for a communication system having a plurality of communication devices, the properties server comprising:
    memory configured to store group properties and global properties used to control operation of the communication devices, wherein group properties are applied to a subset of the plurality of communication devices managed by the communication system, and global properties are applied to all of the plurality of communication devices managed by the communication system; and
    one or more processors configured to:
        manage the group properties and the global properties responsive to modifications made by an administrator;
        resolve conflicts between the global properties and the group properties when at least one property is assigned to both the global properties and the group properties and the at least one property has a different value in the global properties as compared to the group properties; and
        transmit the group properties and the global properties to the communication devices.

2. The properties server of claim 1, wherein the one or more processors are configured to resolve conflicts by applying an override for one of the global properties and the group properties to take precedence over the other.

3. The properties server of claim 2, wherein the override provides that the group properties take precedence over the global properties.

4. The properties server of claim 2, wherein the subset of the plurality of communication devices is based on a level of hearing loss of users of the subset of the plurality of communication devices, a level of vision problems of the users, an age of the users, a legal status of the users, an ownership of the communication devices, or a geographic location of the communication devices.

5. The properties server of claim 2, wherein the subset of the plurality of communication devices is based on a level of hearing loss of users of the subset of the plurality of communication devices.

6. The properties server of claim 1, wherein the one or more processors are configured to transmit a combined set of properties after conflicts between the global properties have been resolved.

7. The properties server of claim 6, wherein the combined set of properties includes a caption default property that has at least two states used to control the communication devices to have captions turned on by default or to have captions turned off by default.

8. The properties server of claim 1, wherein the global properties and the group properties include functional properties selected from the group consisting of: display properties, audio properties, device location properties, operational properties, data storage properties, and software properties that are supported by the communication devices.

9. A communication device comprising:
    one or more processors configured to communicate with a server of a communication system and to receive from the server a set of properties that includes at least one group property and at least one global property, wherein
    the at least one group property is applied to a subset of a plurality of communication devices managed by the communication system, the subset including the communication device,
    the at least one global property is applied to all of the plurality of communication devices managed by the communication system, and
    conflicts between the at least one global property and the at least one group property are resolved by the server when at least one property is assigned to both the at least one global property and the at least one group property and the at least one property has a different value in the at least one global property as compared to the at least one group property; and
    memory operably coupled with the one or more processors, the memory configured to locally store properties used by the one or more processors to operate the communication device, the locally stored properties being configured to be modified responsive to the set of properties received from the server.

10. The communication device of claim 9, wherein the one or more processors are further configured to communicate with a captioning service configured to provide translation services for a hearing-impaired user.

11. The communication device of claim 10, wherein the captioning service includes one of a captioned telephone service and a captioned video service.

12. The communication device of claim 10, wherein the one or more processors are configured to communicate with the server by transmitting a request for the set of properties, and by receiving the set of properties responsive to the request.

13. The communication device of claim 10, wherein the one or more processors are configured to modify at least some of the locally stored properties responsive to a user modifying an endpoint property of the communication device.

14. A communication system comprising:
    a plurality of communication devices; and
    a server operably coupled with the plurality of communication devices, the server configured to:
        organize one or more of the communication devices into a group of communications devices that is a subset of the plurality of communication devices;
        manage a set of global properties that apply to all of the plurality of communication devices;
        manage a set of group properties that apply to the group of communication devices;
        transmit the set of global properties to all of the plurality of communication devices that are not part of the group of communication devices; and
        in response to at least one property being assigned to both the set of global properties and the set of group properties and the at least one property having a different value in the set of global properties as compared to the set of group properties, transmit the set of global properties, other than the at least one property, to the group of communication devices.

15. The communication system of claim 14, wherein the communication devices include captioned communication devices.

16. The communication system of claim 15, further comprising a captioning service operably coupled with the captioned communication devices, the captioning service configured to transmit a text transcription of a voice signal received by the captioned communication devices.

17. A method of a communication device of a communication system having distributed management of configuration properties, the method comprising:
   requesting a set of properties from a server, the set of properties including at least one group property that is shared with another communication device of a same group that is a subset of the communication devices of the communication system, the group based on a level of hearing loss or a level of vision problems of users of communication devices in the group and at least one global property that is shared with other communication devices of the communication system regardless of whether it is of the same group;
   storing the set of properties locally on the communication device; and
   operating the communication device according to the set of properties stored locally on the communication device.

18. The method of claim 17, wherein requesting the set of properties from the server is responsive to an occurrence of an update event trigger.

19. The method of claim 17, wherein the group is based on the level of hearing loss in the group.

20. A communication system for facilitating communication for hearing-impaired people, the system comprising:
   a plurality of communication devices that are each configured to provide assistance for a hearing-impaired user during a real-time conversation;
   a captioning service operably coupled with the plurality of communication devices, the captioning service configured to provide interpretive services for the hearing-impaired users; and
   a server operably coupled with the plurality of communication devices, the server configured to:
      organize one or more communication devices into a group that is a subset of the plurality of communication devices;
      manage a set of global properties that apply to all of the plurality of communication devices;
      manage a set of group properties that apply only to the group of communication devices;
      transmit the set of global properties to all of the plurality of communication devices that are not part of the group of communication devices; and
      in response to at least one property being assigned to both the set of global properties and the set of group properties and the at least one property having a different value in the set of global properties as compared to the set of group properties, transmitting the set of global properties, other than the at least one property, to the group of communication devices, wherein at least one of the set of group properties and the set of global properties includes a property that is associated with the interpretive services provided by the captioning service.

21. A method of managing distributed configuration properties of communication devices of a communication system, the method comprising:
   organizing one or more communication devices of a plurality of communication devices managed by a server into a first group based on one or more first common factors, the first group not including all of the plurality of communication devices;
   organizing one or more communication devices of the plurality of communication devices into a second group based on one or more second common factors, the second group not including all of the plurality of communication devices and including at least one communication device that is not in the first group;
   managing one or more first group properties applied to the first group, one or more second group properties applied to the second group, and one or more global properties applied to all of the plurality of communication devices responsive to modifications made by an administrator;
   resolving conflicts between the one or more global properties and the one or more first group properties when at least one property is assigned to both the one or more global properties and the one or more first group properties and the at least one property has a different value in the one or more global properties as compared to the one or more first group properties by applying a first override, wherein the first override provides that the one or more first group properties take precedence over the one or more global properties;
   resolving conflicts between the one or more global properties and the one or more second group properties when at least one property is assigned to both the one or more global properties and the one or more second group properties and the at least one property has a different value in the one or more global properties as compared to the one or more second group properties by applying a second override, wherein the second override provides that the one or more second group properties take precedence over the one or more global properties;
   transmitting the one or more first group properties and the one or more global properties to the first group; and
   transmitting the one or more second group properties and the one or more global properties to the second group.

* * * * *